Nov. 2, 1965 W. H. KNIPPEL 3,215,092
LOAD-GATE STEERING ARRANGEMENT
Filed Oct. 3, 1963 10 Sheets-Sheet 1

Fig. 1

INVENTOR.
WILLIS H. KNIPPEL

United States Patent Office 3,215,092
Patented Nov. 2, 1965

3,215,092
LOAD-GATE STEERING ARRANGEMENT
Willis H. Knippel, Palos Park, Ill., assignor to Pullman Incorporated, Chicago, Ill., a corporation of Delaware
Filed Oct. 3, 1963, Ser. No. 313,664
8 Claims. (Cl. 105—376)

The present invention relates to a load-dividing arrangement for freight vehicles and, more particularly, to a load-dividing arrangement of the type having a gate which is suspended for movement along a longitudinal and transverse trackway system which serves to guide the gate in a load-dividing position lengthwise of the vehicle or toward a stored position adjacent one of the side walls of the vehicle.

A load-dividing arrangement of the above type is disclosed in U.S. patent application Serial No. 274,038, filed April 18, 1963, and assigned to the assignee of the present invention. The load-dividing arrangement comprises generally a gate which is suspended from a carriage which is ridably supported on a trackway system. The trackway system includes a lengthwise extending trackway along which the carriage is movable and thereby the gate suspended therefrom to a selective load position in which position the gate is latched so as to extend transversely of the vehicle between the side walls thereof.

The trackway system further includes lengthwise spaced transversely extending trackways, each of which extends from the longitudinal trackway toward an associated side wall. The transverse trackways intersect the longitudinal trackways and disposed at the intersection is a turntable for transferring the carriage which suspends the gate for movement therewith between the longitudinal and transverse trackways.

It is a principal object of the present invention to provide a load-gate arrangement of the above described type with a steering arrangement for facilitating the transfer of the gate between the longitudinal and transverse trackways.

It is a further object to provide a load-dividing arrangement of the above type with a steering arrangement which is contsructed and arranged so as to facilitate the transfer of the gate between the longitudinal and transverse trackways and also to facilitate the movement of the gate along the longitudinal trackway to the selective position lengthwise of the car.

It is still a further object to provide a steering arrangement for a load-dividing gate which is constructed and arranged to permit limited turning movement of the gate relative to the carriage.

Further objects and features will hereinafter appear.

In the drawings:

FIG. 9 is a cross-sectional view taken generally along the lines 9—9 of FIG. 8.

Referring now to FIGS. 1–11, the load-dividing arrangement 10 embodying the steering arrangement 210 of the present invention is shown incorporated in a railway car 11 of more or less conventional structure including side walls 12, roof 13 and a floor 14. In the form shown, the load dividing arrangement 10 includes generally, a gate 16 suspended by means of a carriage 17 for movement on a trackway system 18 fixed adjacent to the roof of the car 11.

Figure 1:
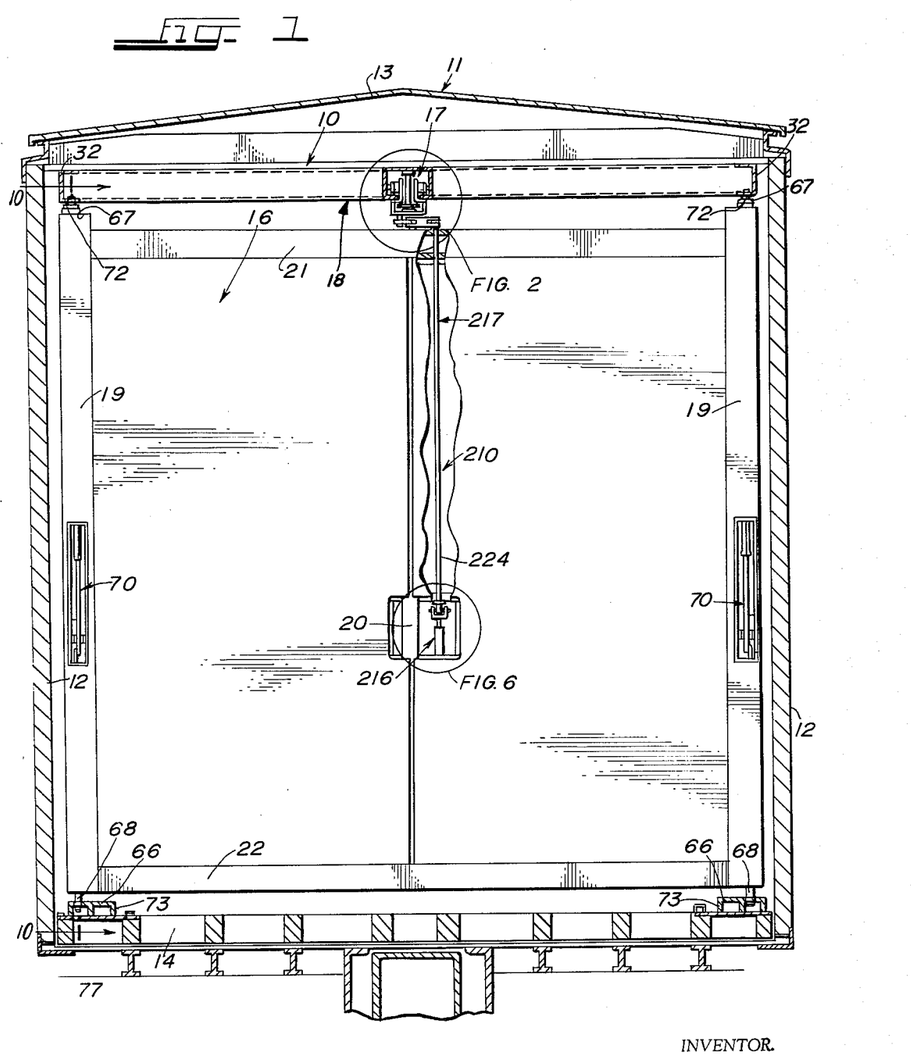
FIG. 1 is a diagrammatic view in elevation of a railway vehicle having a load-dividing arrangements embodying the present invention.

The gate 16 is preferably formed as a rigid structure including side channels 19, a top channel 21 and a bottom channel 22. Fixed to the channels 19, 21, and 22 along the edges thereof are face plates 23. As shown, the gate 16 is arranged to extend the full width of the car 11 and may include intermediate vertical bracing members 20.

Figure 8:
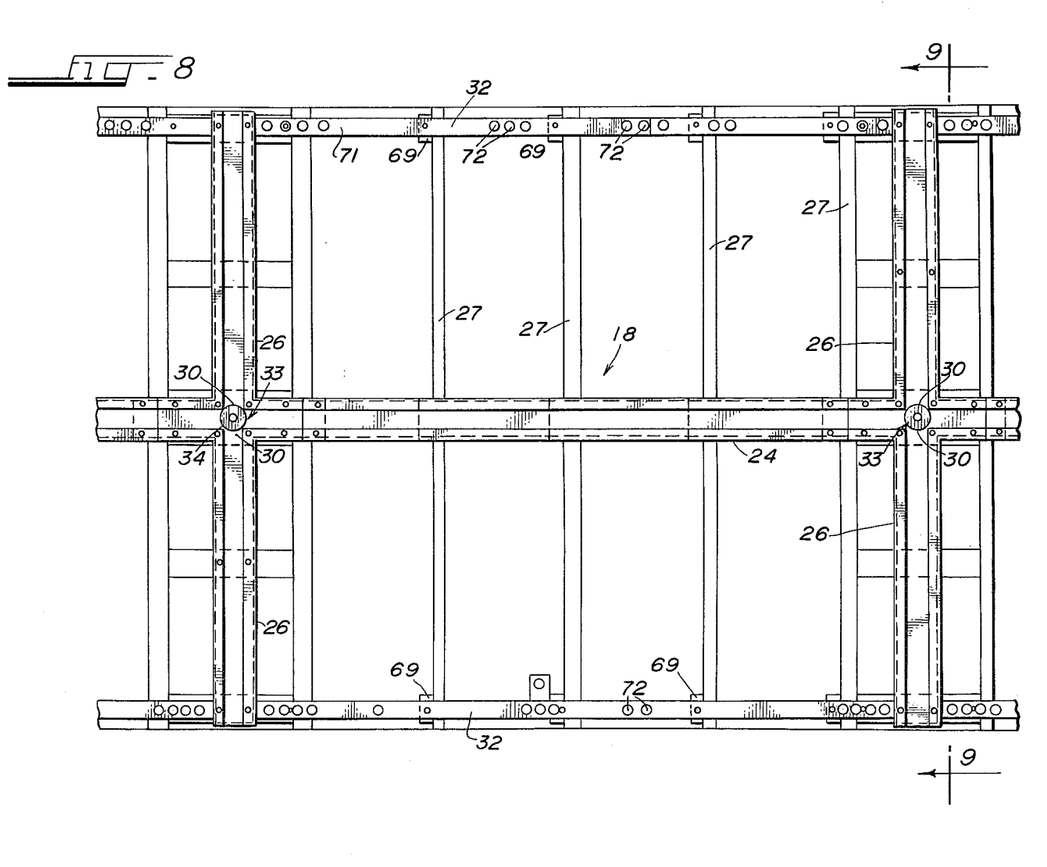
FIG. 8 is an underside plan view of the ceiling of the freight car showing the trackway arrangement.

The trackway system 18 shown in particular in FIGS. 8 and 9 includes a longitudinally extending trackway 24 extending the full length of the car and transversely extending trackways 26 connected at their inner ends to the longitudinally extending trackway 24 and terminating adjacent the sides 12 of the car 11. The longitudinal trackway 24 and transverse trackways 26—26 may each be formed from channel members of substantially C-sections and are suitably fastened to the ceiling of the car 11 along the upper ceiling braces 27 as by brackets 28. The channels are secured such that the open ends thereof face downwardly and the inwardly projecting flanges 29 are disposed horizontally and provide a track surface 31.

The transversely extending trackways 26—26 on the opposite sides of the longitudinal or lengthwise extending trackway 24 are in lateral alignment and fixed at their inner ends about cut-out 30 formed in the lengthwise extending trackway 24 so that the trackway surfaces 31 on each are in substantial horizontal alignment. In this manner the transverse trackways 26—26 each intersect and are in communication with the lengthwise extending trackway 24 so as to facilitate the movement of the gate to a stored position adjacent either one of the side walls 12 as more fully to be explained hereinafter. As shown, there are two sets of transversely extending trackways 26—26, the sets being preferably spaced lengthwise of each other a distance at least greater than one-half the width of the gate so that two gates may be stored adjacent the same side wall in side-by-side relationship. The transversely extending trackways 26—26 are located on either side of the doorways of the car such that the door opening is unobstructed when the gate is in its stored position. The transverse trackways 26—26 at their outer ends are each secured as by welding to upper keepers 32—32 extending lengthwise of the car adjacent the side walls 12. The upper keepers 32—32 form part of a latching arrangement for maintaining the gate 16 selectively positioned as more fully to be explained hereinafter.

Fixed at each of the intersections or junctures 33 of the longitudinally and transversely extending trackways 26 and 24—24 is a gate transfer means or turntable 34 which serves to permit transfer of the gate 16 between the longitudinal trackways 24 and transverse trackways 26—26. As shown in particular in FIGS. 2, 4 and 9, the transfer means 34 each include a vertical post 36 of which the upper end is fixed to the underside of the horizontal web midway of the intersection 33. Fixed to the lower end as by threading is a circular transfer table 37 having a concentric groove 38 formed on the upper face thereof. The transfer table 37 is disposed below the trackway flanges and arranged so that the transfer wheels 39 of the gate carriage 17 are received and supported within the groove 38.

The carriage 17 includes a U-shaped bracket 41 having upstanding legs 42—42 to ends of which there is fixed as by welding the horizontal flanges 43—43 of angle irons 44—44 which support the carriage transfer wheel assemblies 46—46 on the vertical flanges 47—47. The vertical flanges 47—47 of the angle irons 44—44 are spaced from each other to permit the transfer post 36 to pass therebetween.

Figure 2:
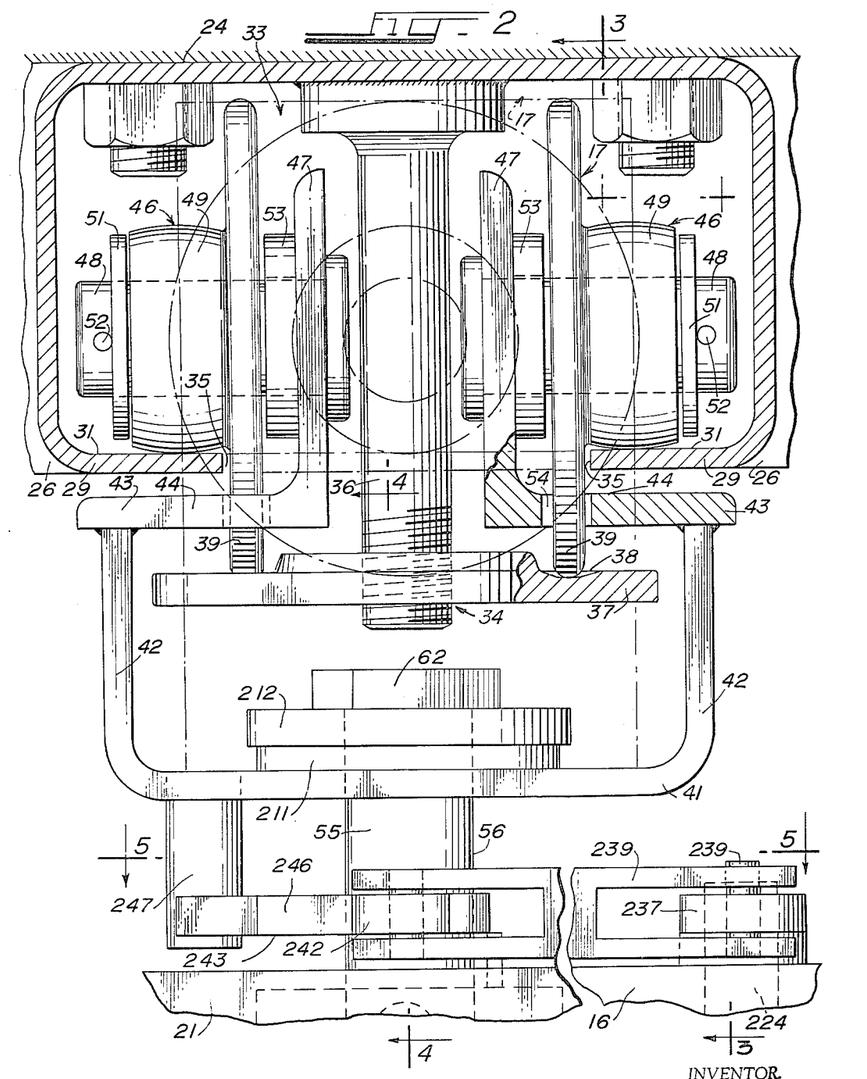
FIG. 2 is an enlarged fragmentary view of the encircled portion of FIG. 1, showing the carriage and gate suspended therefrom at the turntable of the trackway.
Figure 3:
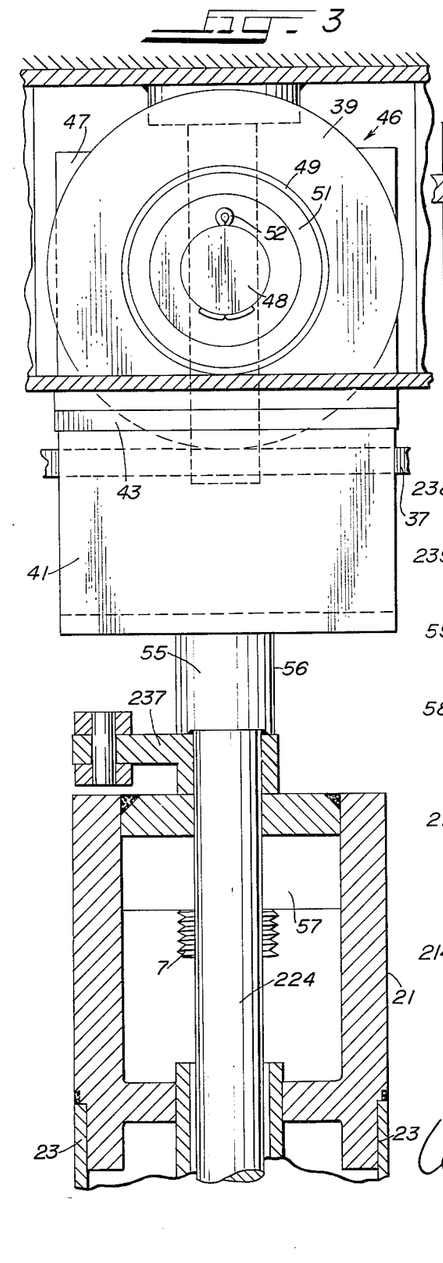
FIG. 3 is a cross-sectional view taken generally along the lines 3—3 of FIG. 2.

The wheel assemblies 46—46 as shown in FIGS. 2 and 3 each include a stub shaft 48 mounted at one end to the vertical web 47 of the angle iron 44. Turnably supported on each of the stub shafts 48 is a carriage wheel 49 ridable on the track surfaces 31 of the trackways 26 and 24—24. Disposed inwardly of each of the carriage wheels 49—49 and turnable about the respective shafts 48 is the transfer wheel 39 which is of larger diameter than the carriage wheel 49 and which is ridable on and engageable with the turntable 37. The transfer wheels 39 are spaced so as to be disposed within and clear of the inner edges 35 of the trackway flanges 29. As shown, the transfer wheels 39—39 and carriage wheels 49—49 may be formed integral with each other, but it is to be understood that they may be separate units. The transfer wheels 39—39 and carriage wheels 49—49 are retained on the respective shafts 48 by means of a washer 51 and cotter pin 52. A spacer 53 is disposed between the transfer wheels 39—39 and the vertical web 47 to locate the latter on the shaft 48. The transfer wheels 39 extend through slots 54 formed in the horizontal flanges 43 of the angle members 44 so that the rims thereof are ridable within the grooves 38 of the transfer table 37.

Figure 4:
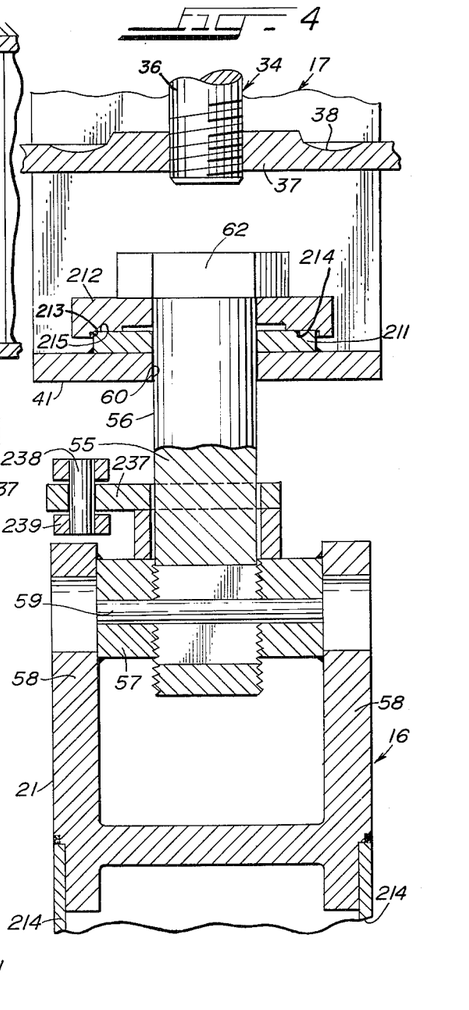
FIG. 4 is a cross-sectional view taken generally along the lines 4—4 of FIG. 2.
Figure 5:
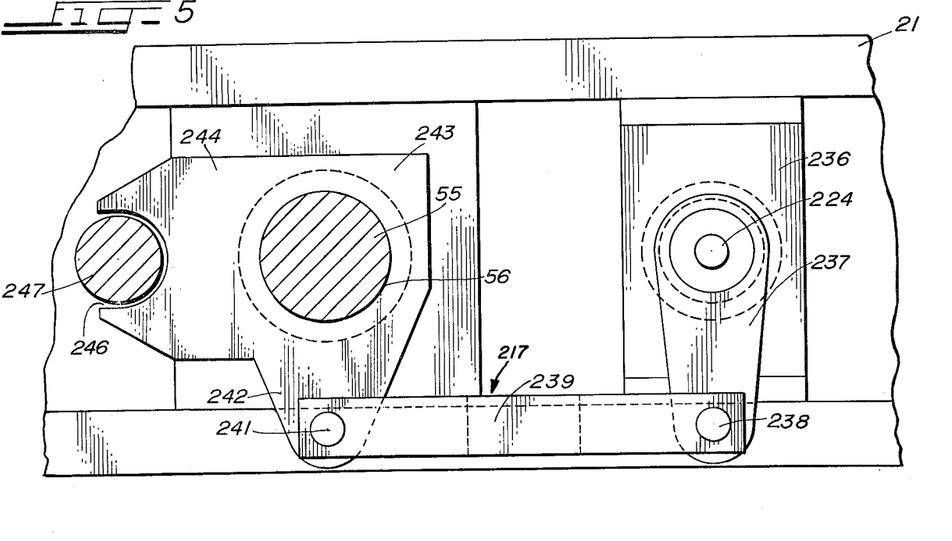
FIG. 5 is a cross-sectional view taken generally along the lines 5—5 of FIG. 2 showing in particular the steerage linkage located at the top of the gate.

As shown in particular in FIG. 4, suspending the gate 16 from the carriage 17 for movement on the trackway arrangement 18 is a hanger means or bolt 56 of which the lower end of the shank 55 is threaded into a hanger block 57 fixed between the upright flanges 58 of the top channel 21 of the gate 16. To prevent relative turning of the hanger bolt 56 in the hanger block 57 a dowel pin 59 is inserted through the block 57 and the shank 55.

The upper end of the hanger bolt shank 55 extends through an opening 60 formed in the bight of the carriage bracket 41 and through a metallic annular wear plate 211 which is fixed as by welding to the upper surface of the bight. Fastened to the underside of the bolt head 62 as by welding is a metallic turn plate 212 having a circular seat 213 which is seatable on the annular wear plate 211. Formed in the seat 213 is an annular friction face 214 which contacts the face 215 of the wear plate. The annular friction face 214 is formed to provide a surface area such that a predetermined turning force is required to cause relative turning between the turn plate 212 and wear plate 211. Hence, until such predetermined force is applied, the friction between the faces 213 and 215 is effective to restrain or prevent relative turning between the carriage 17 and gate 16.

The above described suspending arrangement also permits the gate 16 to be elevated a limited height. When the gate 16 is lifted, as during latching to hold the gate against movement along the trackways, the bolt shank 55 slides upwardly through the opening 60 and the opening in annular wear plate 211. During the lifting, the bolt head and the turn plate or friction disc 212 are also elevated with respect to the wear plate fixed to the carriage bracket 41.

Referring now to FIGS. 1–7, there is shown the steering arrangement for moving the gate suspended from the carriage along the trackway system. The steering arrangement may include generally a handle mechanism 216 located on the gate and a steering linkage 217 for transmitting the directional movements of the handle mechanism to the carriage 17.

Figure 6:
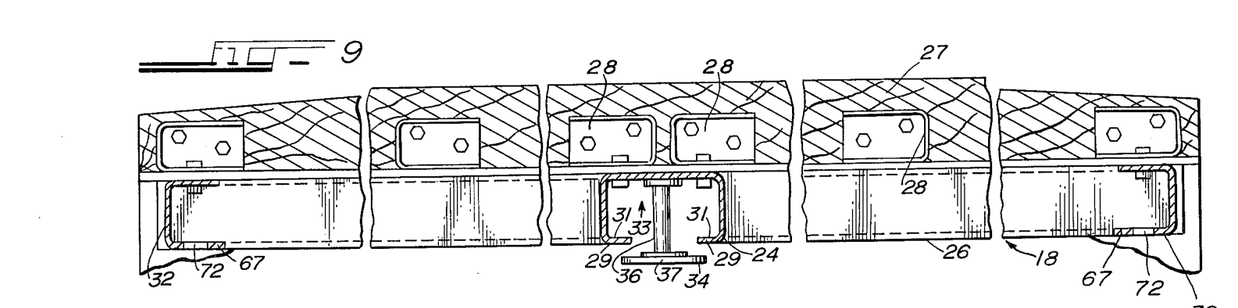
FIG. 6 is an enlarged view of the steering handle taken generally within the encircled portion of FIG. 1.

The handle mechanism 216, as shown in particular in FIG. 6, is disposed within a handle recess formed in the gate 16 to one side of the central reinforcing member 20. The recess may be formed by a cut-out in one of the face plates 23 about which there is fixed side plates (not shown) and top and bottom plates 218 and 219 respectively. The side plates and top and bottom plates 218 and 219 extend between and are fixed to the inner walls of the face plates 23.

Extending through an opening 221 formed in the upper plate which may be suitably reinforced by collars 222 and 223 is the lower end of a steering shaft 224. Fixed to the lower end of steering shaft 224 is a journal member 226 through which there extends a pivot pin 227 which is supported at the resspective ends by a clevis block 228. The pin is suitably fixed as by cotter pins.

Fixed to the clevis block 228 is a handle bar 229 through the lower end of which there extends a roll pin 231 having the ends thereof projecting outwardly of the periphery of the bar 229. Slidably disposed about the handle bar 229 is a tubular hand grip member 232 having diametrically formed elongate slots 233—233 in which the projecting ends of the roll pin 231 are received. The hand grip member 232 is thus rendered lengthwise movable of the handle bar 299 between the retracted position in which position the lower end of the hand grip 232 may be disposed within a lower retaining slot 234 formed in the lower plate 219. To remove the hand grip 232 from the retainer slot 234 the former is lifted or telescoped upwardly relative to the handle bar 229. Thereafter the handle bar may be swung outwardly of the recess about the pivot pin 227 and the hand grip 232 may be extended so that the steering shaft 224 may be turned about its vertical axis.

The upper end of the steering shaft 224 projects upwardly through a journal block 236 fixed between the vertical legs of the top gate channel 21. Fixed to the projecting end of the steering shaft 224 for turning movement therewith is a lever arm 237 of the steering linkage 217.

Figures 6, 7:
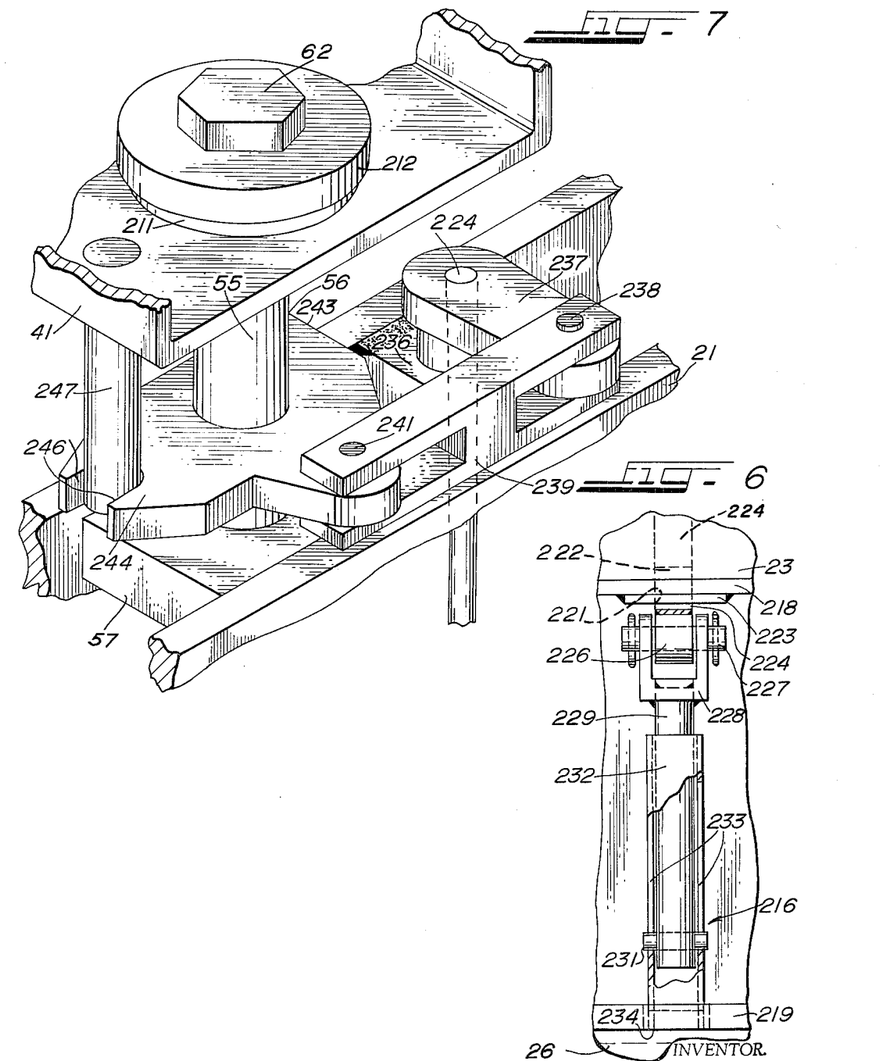
FIG. 7 is a fragmentary isometric view of the steering linkage and showing in particular the connection between the gate and the carriage.

The steering linkage 217 includes the lever arm 237, to the outer end of which there is pivotally connected by means of a pin 238 one end of a connecting lever 239. The connecting lever 239 is connected at its other end by means of a pin 241 to an arm 242 of a bell crank 243 which is mounted for turning movement about the shank 55 of the hanger bolt 56. The other arm 244 of the bell crank 243 is formed with an open-ended, U-shaped slot 246 into which there projects a pin 247 which is fixed as by a force-fit at the upper end thereof into the bight of the carriage bracket 41.

Figure 12:
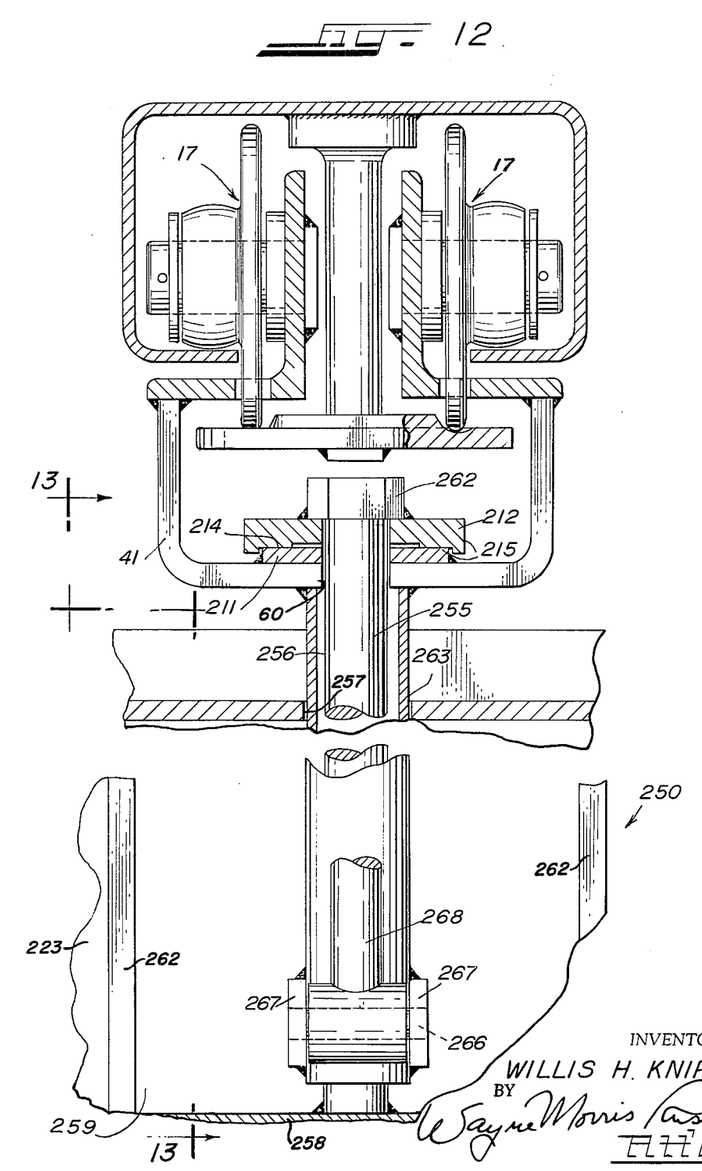
FIG. 12 is a fragmentary elevational view of a steering arrangement which may be employed in a gate construction in which a central vertical reinforcing member is eliminated.
Figure 13:
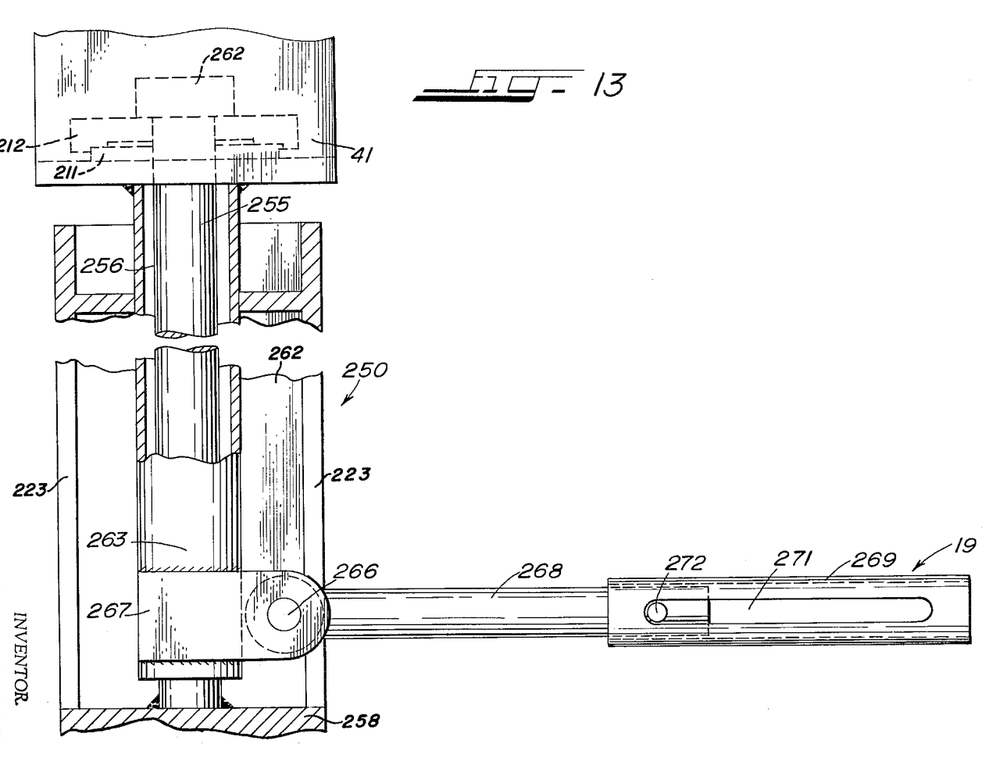
FIG. 13 is a cross-sectional view taken generally along the lines 13—13 of FIG. 12.

Referring now to FIGS. 12 and 13, there is shown a gate suspension and steering arrangement which is suitable for a gate 250 in which the central reinforcing post 20 shown in FIG. 1 is not present. The construction of the carriage or trolley 17 is identical to that above described. However, the hagner bolt 255 extends downwardly through the bracket opening 60 and an opening 257 in the top channel and is suitably fastened at its lower end to a bottom wall 258 of a handle recess 259 formed in the gate 16. The bottom wall 258, as are the top (not shown) and side walls 262 of the handle recess 259, are fixed between the inner faces of the gate facing sheets 223.

Connected to the underside of the head 262 of the hanger bolt 255 is the turn plate on the underside of which there is formed the annular frictional face 215. The annular fractional face 215 contacts the frictional face 214 of the annular wear plate 211 to function as described above in connection with the structure shown in FIGS. 1 to 7.

Connected to the underside of the head 262 of the 41 is one end of a tubular steering shaft 263 which is coaxially disposed about the hanger bolt 255. The lower end of the steering shaft 263 projects through an opening (not shown) in the top wall (not shown) of the handle recess 259 and the terminal end thereof is spaced from the bottom wall 258. Pivotally connected to the end of the steering shaft 263 by means of a pivot pin 266 which is supported by a pair of spaced flanges 267—267 fixed to the lower end of the shaft 263 is a handle bar 268. Telescopingly disposed about the handle bar 268 is a tubular extension hand grip 269 having elongate slots 271 which receive the projecting ends of a roll pin 272 fixed in the bar 268.

In the non-use position the tubular extension handle 269 is telescoped over the handle bar 268 and the latter is pivoted about the pivot stud 266 to a position parallel to the steering shaft 263. In the use position the handle bar 268 is pivoted outwardly and the tubular extension handle 269 is telescoped to its maximum length as shown in FIG. 13.

As shown in particular in FIGS. 1 and 8–11, extending along the ceiling and floor of the car adjacent the side walls are keepers 32—32 and 66—66 which are arranged to co-act with latching spuds 67—67 and 68—68 disposed along the sides of the gate 16 adjacent the top and bottom thereof. The upper keeper bars 32—32 may each be formed in sections divided by the transversely extending trackways to which the ends of the sections may be fixed as by welding. Further supporting the keepers 32 on the ceiling are a plurality of lengthwise spaced brackets 69. The keepers 32—32 may each be formed from a channel of C-section as shown and the horizontal flanges 71 are provided with a plurality of lengthwise spaced openings 72 adapted to receive the upper locking or latching spuds 67.

The lower keepers 66—66 as shown may each be formed of a channel of C-section having the legs 73 thereof fixed as by welding to a horizontal plate 74 suitably attached by bolts to the floor. The horizontal web 76 is formed with longitudinally spaced openings 77 for receiving the lower spuds 68 of the gate latching mechanism 70. The openings 77 in the lower keepers 66 are arranged to be aligned with respective ones of the openings 72 of the upper keepers 32 so that the gate 16 is maintained in a substantially verical plane when locked.

Figures 10A, 10B, 10C:
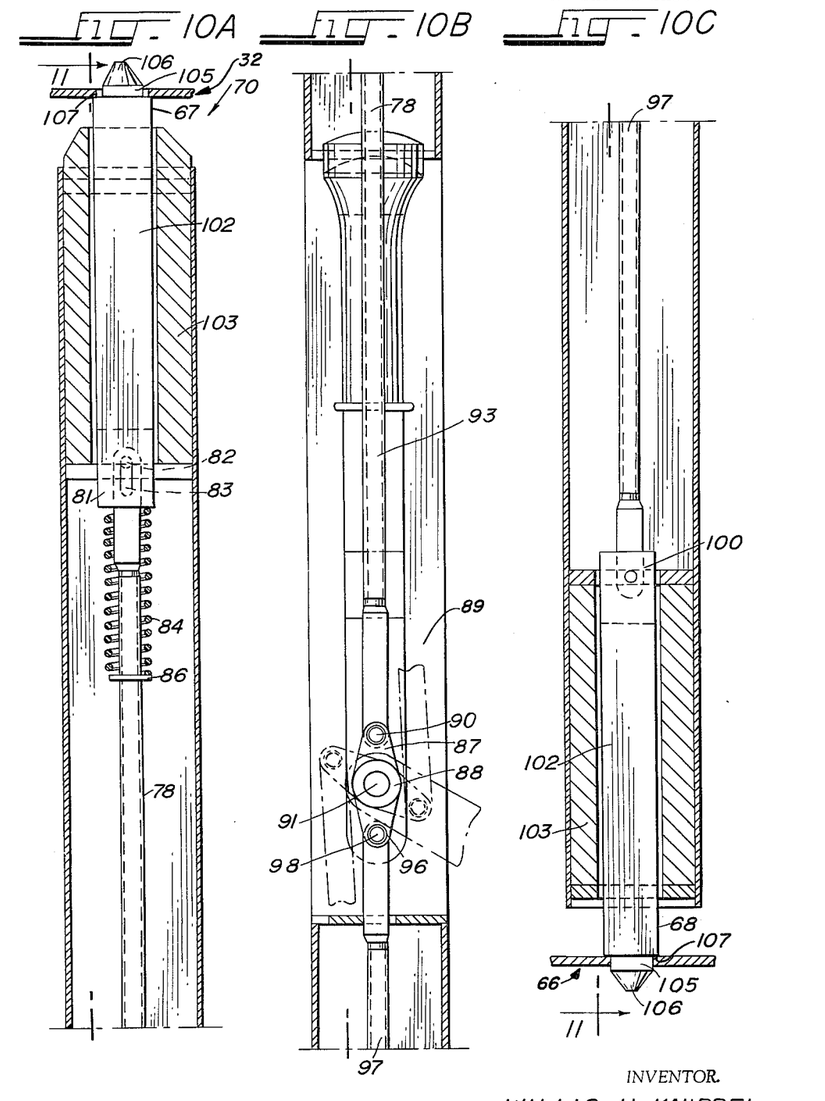
FIGS. 10A, 10B, and 10C taken together are an enlarged cross-sectional view taken generally along the lines 10—10 of FIG. 1 showing the latching mechanism.

The latching mechanisms 70 along each side of the door are each of similar construction such that it is only necessary to describe one herein. As shown in FIGS. 10A, B and C and 11A, B and C, the latching mechanism 70 includes the upper and lower spuds 67 and 68 respectively. Associated with the upper spud 67 is an actuating rod 78 having a slotted upper end 83 which is disposed between the clevis arms 81 of the upper spud 67. Fastening the rod 78 to the spud 67 is a pin 82 fixed to the clevis arms and extending through the slot 83 so that the rod 78 and spud 67 are movable lengthwise relatively to each other a limited distance. A biasing spring 84 is disposed between a stop disc 86 fixed to the rod and the lower end of the spud 67 to normally urge the upper spud 67 upwardly relative to the rod 78.

At its lower end the actuating rod 78 is turnably connected to a crank arm 87 of a crank lever member 88 located in an actuating handle recess 89 formed in the side channel 19. The crank lever member 88 is journaled on a pin or shaft 91 extending horizontally through the recess 89 and fixed at one end to the web of the side channel and at its other end to the outer wall of the member 92 defining the recess 89. Also turnably supported on the pin 91 is a handle 93. The lower end of the upper actuating rod 78 is connected to the crank arm 87 by means of a pin 90 fixed to the lower end of rod 78 and projecting into journal openings 94–94a formed in the crank arm 87 and handle 93 respectively.

The other crank arm 96 is connected to the upper end of a lower spud actuating rod 97 by means of a pin 98 fixed thereto and extending through openings 99–99a formed in the crank arm 96 and handle 93. The lower end of the actuating rod 97 is disposed between the clevis arms 100 formed on the upper end of the lower spud 68 and fastened thereto by a pin 101.

The upper and lower locking spuds 67 and 68 may each be formed with a portion of the length 102 thereof formed of rectangular section which is disposed within a guiding arrangement 103 defining a complementary rectangular opening 104 formed along the top and bottom of the gate. In this manner the spuds are freely guided for vertical movement within the guide arrangements and at the same time prevent relative turning or twisting between the gate and the spuds. The ends of the spuds 67 and 68 are each formed of circular section 105 sized so as to be snugly received within the keeper openings 72 and 77. To facilitate the entry of the spuds in the openings the ends 106 may be tapered.

Figure 11A:
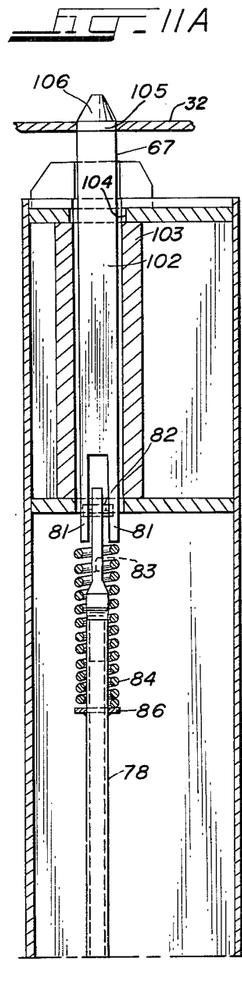
FIGS. 11A, 11B, and 11C taken together are a cross-sectional view taken generally along the lines 11—11 of FIGS. 10A, 10B and 10C.
Figure 11B:
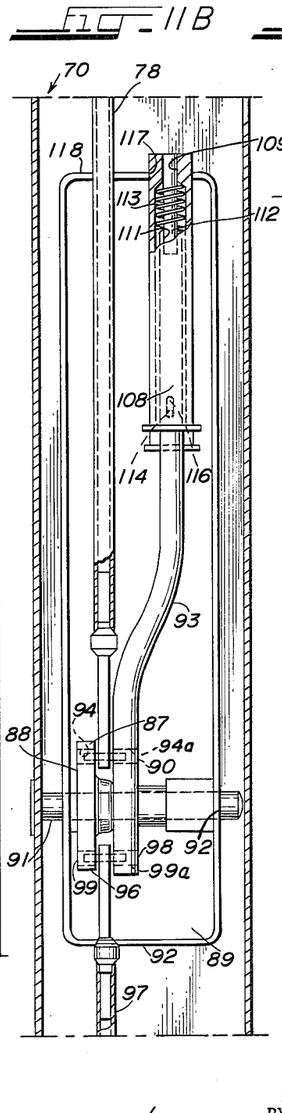
Figure 11C:
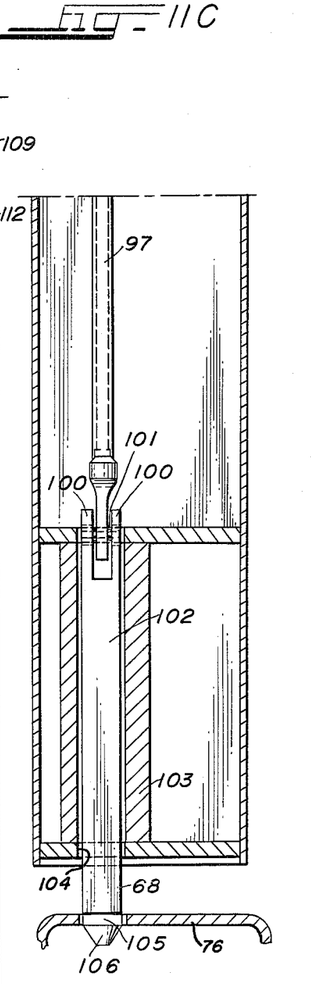

In the latched or locked position of the latching means 70, the components thereof are in the position shown in FIGS. 10A, B and C and FIGS. 11A, B and C. In this position the handle 93 is in a substantially upright position such that pins 90 and 93 connecting the handle 93 to crank arms 87 and 96 and to the upper and lower spud actuating rods 78 and 97 are also disposed in a substantially vertical plane. In this position the upper and lower locking spuds 67 and 68 are projected outwardly of the guiding arrangement 103 and the heads 105 are received within the respective upper and lower keeper openings 72 and 77 as shown. In this position the shoulders 107 of the upper and lower spuds 67 and 68 abut the respective horizontal webs 71 and 76 of the keepers. The length of the lower spud actuating rod 78 is selected such that the gate 16 is elevated when the lower spud shoulder 107 abuts the keeper. In this manner the lower spud 68 and the actuating rod connected to the crank arm and pin are operative to elevate the gate 16 so that the latter is not supported by the suspension stud in the locked position.

To release the gate from its locked position the handles 93 are turned clockwise as shown in phantom in FIG. 10B. In this connection it is to be noted that the handle 93 may include a safety latch for retaining it in the locked position shown. The safety latch includes a sleeve 108 disposed over the end of the handle 93. The sleeve 108 may be contoured to provide a convenient grip. Axially aligned openings 109 and 111 in the top of the sleeve grip and the top of the handle bar, receive a guide pin 112 about which there is disposed a biasing spring 113 which urges the sleeve grip 108 outwardly of the end of handle 93. Limiting the outward movement is a pin 114 fixed to the grip sleeve 108 and extending through an elongated opening 116 in the handle 93. In the locked position the sleeve grip 108 is biased upwardly and the upper end thereof is disposed within an opening 117 formed in the web 118 of the handle recess defining member 92. In order to turn the handle clockwise, the sleeve grip 108 is initially depressed downwardly on the handle 93 against the force of the biasing spring 113 to the phantom position shown in FIG. 10B and thereby free to turn clockwise out of the hand recess 89.

As the handle is thus moved clockwise, the shaft 91 is turnable therewith such that the crank arms 87 and 96 are disposed in a substantially horizontal position in which position the upper and lower spuds 67 and 68 are retracted from the keeper openings 72. At the same time the gate 16 is lowered and suspended from the carriage 17.

Describing first the operation of the steering arrangement shown in FIGS. 1–7, upon lowering of the gate 16 the annular friction face 214 on the turn plate 212 fixed to the under side of the head 62 seats in the mating frictional face 214 of the wear plate 211. The steering handle 216 is then released from the handle recess and the hand grip 232 is extended to its maximum length.

Assuming that the carriage 17 is located on the longitudinal trackway 24, the handle 216 is employed to move the gate 16 therealong. Prior to initiating movement of the carriage 17, the gate 16 is usually canted at an angle from the normal load dividing position transverse to the side walls to provide adequate clearance between the ends thereof and the side walls. Canting of gate 16 is accomplished by holding the handle 216 to prevent axial turning of the steering shaft 224 and pushing on the gate 16 to one side of the center thereof such that a force sufficient to overcome the friction between the metallic faces of the wear plate 211 and turn plate 212 is created. This causes the suspension bolt 56 and the plate 212 to turn on the plate 211, and thereby the gate 16 fixedly suspended therefrom, to turn relatively to the carriage 17. Turning of the gate 16 occurs without corresponding turning of the carriage 17 because the bolt shank 55 and the cell crank 243 are freely turnable relatively to each other. When the steering shaft 224 is held against turning the bell crank 243 freely turns about the bolt shank 55 so that pin 247 depending downwardly from and disposed between the bell crank arm slot 246 remains stationary.

When the gate 16 is in the desired canted position the friction surfaces 214 and 215 of the plates 212 and 211 are operative to restrain relative turning between the gate 21 and the carriage 17, the handle 216 is employed to push the trolley along the longitudinal trackway 24 in the canted position. In view of the close proximity of the transfer wheels 39 to the inner edges 35 of the horizontal tracks 29, the steering arrangement is advantageously employed to prevent binding of the carriage 17 along the trackway.

Assuming it is desired to store the gate along one of the side walls, the gate 16 is moved to one of the track junctures so that the transfer wheels 39 on the carriage 17 engage the turntable 37 and the carriage wheels 46 are free of the tracks 29. Thereafter, the steering handle is turned 90° in the direction of the transverse trackway 26 which extends toward the side wall against which the gate is to be stored. Turning of the handle 216 causes the steering shaft 224 fixed to the former to be correspondingly turned about its longitudinal axis. At the same time, the lever arm 237 fixed to the upper end of the shaft 234 is also turned such that the connecting link 239 is effective to turn the bell crank 243. As the bell crank 243 turns, the pin 247 fixed to the carriage hanger bracket is engaged by one of the sides of the slot 246 in the arm 244 so that the carriage 17 is turned in the turntable 37 and thereby to align the carriage wheels 49 with the tracks 29 of the transverse trackway to the phantom line position shown in FIG. 2. Due to frictional force between the mating faces of the turn plate 212 fixed to the hanger bolt 56 and the wear plate 211 on the bracket 41 of the carriage 17, the gate 16 is simultaneously turned.

Thereafter, the gate 16 is moved along the transverse trackway 26 such that the carriage wheels 49 are supported on the tracks 29 thereof whereupon the carriage 17 is rolled along the transverse track to locate the gate adjacent the side wall.

The gate 16 may then be turned relative to the carriage out of the canted position to a position parallel to the side wall so that the latching spuds 67–68 are aligned with keeper opening 72 whereupon the latching mechanisms 70 may be engaged to lock the gate 16 in the stored position. Turning of the gate relative to the bracket is accomplished as described above by holding the steering handle 216 against turning and pushing the gate 16 with a force necessary to overcome the friction between the turn plate 212 and bracket wear plate 211.

Assuming now that a gate 16 equipped with the steering arrangement disclosed in FIGS. 12 and 13 is employed and the gate 16 and carriage 17 are disposed on the longitudinal trackway 24, the gate 16 may be initially canted at an angle transverse to the side walls 12. This is accomplished by holding the steering handle 268–269 against turning and applying a pushing force to one side of the longitudinal center line of the gate with a force sufficient to overcome the friction between the turn plate 212 and wear plate 211. The steering handle is thus operative to hold the steering shaft 256 against turning and, accordingly, the carriage 17 fixed thereto while the turn plate 212, fixed to the hanger bolt 255 suspending the gate 216 therefrom, turns on wear plate 211 to position the gate 216 at the desired angularity. Thereafter the carriage 17, having the gate 216 suspended therefrom, is moved along the trackway by pushing or pulling at the steering handle 268–269 which is also used to guide and steer the carriage so that the transfer wheels 39 do not bind along the edges 35 of the horizontal track flanges 31. During such movement of the carriage 17 the friction between the turn plate 212 and wear plate 211 is such that substantially no relative turning movement occurs between the gate 216 and the carriage 17.

When it is desired to locate the gate 216 in a stored position, the carriage 17 is located at the turntable 37 to that the carriage wheels 49 are free of the horizontal track flanges 31 while the transfer wheels 39 are supported on the transfer table 37. Thereafter, the steering handle 268–269 is turned 90° in the direction of the transverse trackway 26 extending toward the side wall against which the gate is to be stored. The gate 216 turns simultaneously therewith by way of the frictional connection at the hanger bolt turn plate 212 and carriage wear plate 211. The carriage 17 and the gate 216 are then moved along the transverse trackway toward the side wall whereupon the gate may be latched as described in connection with FIGS. 1 to 11.

What is claimed is:

1. A load dividing arrangement for a freight vehicle including longitudinally and transversely extending trackways supported adjacent said ceiling, said load dividing arrangement comprising gate means, cariage means movably along said longitudinal and transverse trackways, hanger means fixed to said gate means, support means fixed on said carriage for turnably suspending said hanger means and thereby said gate therefrom, co-acting friction means on said support means and said hanger means operative to prevent relative turning between said support means and said hanger means until a force greater than the friction force between said co-acting friction means is applied therebetween, and steering means turnably supported on said gate and connected to said carriage means so that upon turning thereof said carriage is correspondingly turned and steered along said trackways with said gate frictionally restrained against turning and suspended therefrom.

2. A load dividing arrangement for a freight vehicle including longitudinally and transversely extending trackways supported adjacent said ceiling, said load dividing arrangement comprising gate means, carriage means movably along said longitudinal and transverse trackways, hanger means fixed to said gate means for suspending said gate from said carriage means, support means fixed on said carriage is turnably suspending said hanger means and thereby said gate therefrom, first friction means on said support means, second friction means on said hanger means engageable with said first friction means when said gate is suspended from said carriage means so as to prevent relative turning between said hanger means and said carriage means until a force greater than the friction force between said first and second friction means is applied therebetween, and steering means supported on said gate for turning movement relative thereto and connected to said carriage means so that upon turning said steering means said carriage is correspondingly turned and steered along said trackways with said gate frictionally restrained against turning and suspended therefrom.

3. The invention as defined in claim 2 wherein said steering means comprise a vertical steering shaft means turnable about the vertical axis thereof, and linkage means connected between said carriage means and said vertical shaft means so that said carriage means is turned in response to turning of said vertical steering shaft means.

4. The invention as defined in claim 3 wherein said linkage means comprises a lever arm fixed to said steering shaft means for turning movement therewith, bell crank means having two angularly spaced arms, means connecting one of the arms of said bell crank to said carriage means, and linkage means connected between said lever arm and the other of said bell crank arms for turning said bell crank in response to turning of said vertical steering shaft means so that said carriage means is correspondingly turned.

5. The invention as defined in claim 3 wherein said steering shaft means is disposed to one side of the vertical center line of said gate.

6. The invention as defined in claim 3 wherein said steering shaft means is disposed to one side of the vertical center line of said gate and terminates at one end between the top and bottom of said gate and wherein extensible handle means are pivotally connected to said one end.

7. The invention as defined in claim 2 wherein said steering means comprises a vertically disposed tubular shaft means coaxially disposed about said hanger means and fixedly secured at one end to said carriage means.

8. The invention as defined in claim 7 wherein an extensible handle means is pivotally secured to the other end of said steering shaft means.

References Cited by the Examiner
UNITED STATES PATENTS
2,360,029  10/44  Wieden _______________ 105—376

ARTHUR L. LA POINT, *Primary Examiner.*